United States Patent [19]

Petit et al.

[11] 4,373,909
[45] Feb. 15, 1983

[54] GAS INJECTING KILN SHELL NOZZLE WITH PARTICLE ENTRY BARRIERS

[75] Inventors: Peter J. Petit; Thomas J. Gill, both of Milwaukee, Wis.

[73] Assignee: Allis-Chalmers Corporation, Milwaukee, Wis.

[21] Appl. No.: 323,897

[22] Filed: Nov. 23, 1981

[51] Int. Cl.³ .............................. F27B 7/36; F27B 7/06; C02M 45/00; C21B 11/06
[52] U.S. Cl. .................................... 432/109; 34/241; 239/553.5; 266/173; 432/113
[58] Field of Search ....................... 432/103, 109, 113; 34/130, 241; 239/553.5; 266/173, 187, 266; 110/182.5

[56] References Cited

U.S. PATENT DOCUMENTS

| | | | |
|---|---|---|---|
| 1,216,667 | 2/1917 | Downs | 432/109 |
| 2,091,850 | 8/1937 | Gohre | 432/109 |
| 3,182,980 | 5/1965 | Helfrich | 432/109 |
| 3,404,845 | 10/1968 | Schmeling et al. | 239/553.5 |
| 3,511,631 | 5/1970 | Chaumont | 110/182.5 |
| 3,794,483 | 2/1974 | Rossi | 432/109 |
| 3,847,538 | 11/1974 | Rossi | 432/113 |
| 3,946,949 | 3/1976 | Rossi | 266/265 |
| 4,070,149 | 1/1978 | Rossi | 432/109 |
| 4,214,707 | 7/1980 | Flaherty | |

Primary Examiner—John J. Camby
Attorney, Agent, or Firm—Timothy R. Conrad

[57] ABSTRACT

A port assembly for delivering fluid through a shell of a rotary kiln is disclosed with structures for screening and excluding particulate matter from the port during operation of the kiln. The port assembly comprises a cylindrical nozzle defining a nozzle orifice to deliver fluid to the interior of a kiln. A base member secured to one side of the nozzle is provided with a platform extending partly through the nozzle orifice and cooperates with the nozzle to define an annular chamber. Facing surfaces of the base member and nozzle define a fluid distribution cavity for providing fluid to the annular chamber for ultimate distribution into the kiln. An annular shoulder surrounding the platform within the fluid distribution cavity cooperates with a facing surface of the nozzle to define a particle barrier gap. The annular chamber and particle barrier gap form a screening mechanism whereby particles too large to pass into the chamber are excluded and particles small enough to pass into the chamber are excluded by the gap. Passage of particle smaller than the particle barrier gap through the gap is opposed and flushed by a turbulent flow of fluid from the fluid distribution cavity.

4 Claims, 7 Drawing Figures

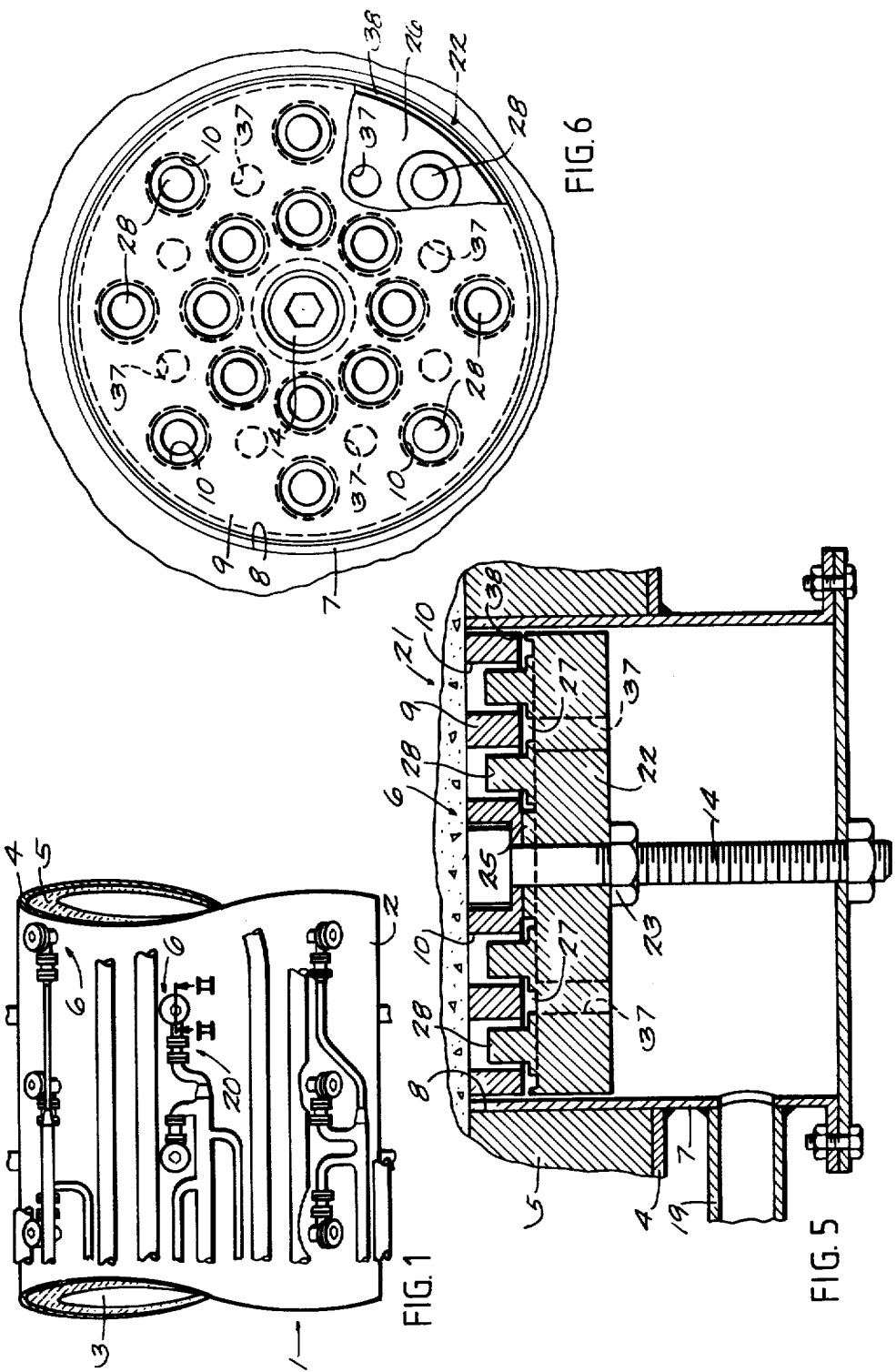

GAS INJECTING KILN SHELL NOZZLE WITH PARTICLE ENTRY BARRIERS

CROSS REFERENCE TO RELATED PATENT APPLICATION

This application discloses a port for delivering fluid to a reactor, such as a rotary kiln, which is the subject of copending and commonly assigned U.S. patent application entitled "Kiln Shell Nozzle With Annular Fluid Delivery" of Walter J. Hartwig and Peter J. Petit, filed concurrently with this application.

BACKGROUND OF THE INVENTION

1. Field of the Invention

This invention relates to reactors, such as rotary kilns, for the treatment of a tumbling bed of mix sized pulverulent material and particularly to ports in the kiln shell for discharging gases such as fuel, steam and/or air to the interior of a rotary kiln wherein the port is resistant to plugging and self-purging of the pulverulent material.

2. Description of the Prior Art

In the prior art, rotary kilns are known wherein a plurality of ports are provided through the shell of the kiln to admit air and fuel into the interior of the kiln. Examples of such prior art kilns are disclosed in U.S. Pat. Nos. 1,216,667; 2,091,850 and 3,182,980. Nozzles for such kilns are disclosed in U.S. Pat. Nos. 3,794,483; 3,946,949 and 4,214,707. Mechanisms for operating such nozzles are disclosed in U.S. Pat. Nos. 3,847,538 and 4,070,149.

In certain of the prior art, e.g., U.S. Pat. Nos. 1,216,667 and 2,091,850 kiln fuel and/or air is injected into the kiln through ports while the ports are below the material charge of the bed. In the other of the aforesaid prior patents, air and such as a fuel gas is injected alternately with the fuel gas being injected when the ports are beneath the bed of the material charge and air being injected when the ports are over the bed. With the aforesaid apparatus operated to process mixed size materials, the smaller particles may enter the ports and associated piping impairing the flow of fluid through the ports and eventually causing complete clogging of the port, rendering it useless for under bed fluid injection.

Additionally, while such rotary kilns may have as many as 600 nozzles, commonly five or more of the nozzles are activated by a single valve. Consequently, if material particles enter the associated piping through any one port and damage a valve, numerous ports will become inoperative. This is particularly troublesome where a port is normally inactive and makes numerous passes beneath a bed of material with no gas passing through the port or associated piping. Thus, when a port or number of ports become useless by reason of being plugged or by damage to an associated control valve, the capacity of the kiln is reduced and its operational time span between maintenance periods is reduced.

A more recent U.S. patent, U.S. Pat. No. 4,214,707 to Flaherty dated July 19, 1980 discloses a self-purging port for a rotary kiln. In the Flaherty patent, the port has a nozzle having a plurality of orifices for passing fluid to the interior of a kiln. Behind the nozzle is a labyrinth trap. Particulates from the kiln are allowed to pass through the nozzle orifices into the trap as the port passes beneath material in the kiln. A plurality of orifices in the trap causes fluid to swirl as the fluid passes through the trap on its way to the interior of the kiln. This swirling causes the fluid to pick up the particulates in the trap and carry them into the kiln.

It is the general object of the present invention to provide a further improved port construction which is resistant to plugging and easily purged by flowing fluids.

Another object of the present invention is to provide a port which successively screens particulate matter thereby achieving a substantial reduction in the quantity of particulates entering the port body as well as flushing out particulates that do enter the port body.

Still another object of the present invention is to provide a port comprising a plurality of particulate screening mechanisms where each screening mechanism within the port acts independently of the other mechanisms to readily permit scaling up the port design and whereby plugging of one mechanism does not result in the loss of an entire port.

SUMMARY OF THE INVENTION

According to a preferred embodiment of the present invention, there is provided a port assembly including a cylindrical nozzle having at least one orifice therethrough. Adjacent the nozzle is a base member which cooperates with the nozzle to define a fluid distribution cavity between the nozzle and base member.

A cylindrical platform is provided extending from the base member through the fluid distribution cavity and into the nozzle orifice. The platform cooperates with opposing walls of the nozzle to define an annular chamber. An annular shoulder integral with the base of the platform cooperates with facing surfaces of the nozzle to define a particle barrier gap. The shoulder is sized so the particle barrier gap is smaller than the annular chamber.

The annular chamber and particle barrier gap are in communication with the fluid distribution cavity to permit passage of fluid through the nozzle. Additionally, the chamber and gap provide a screening mechanism whereby particles too large to pass into the chamber are screened therefrom and particles small enough to pass into the chamber are screened from the fluid distribution cavity by the particle barrier gap. Passage of particles small enough to pass through the gap is opposed and flushed by a turbulent flow of fluid from the fluid distribution cavity through the gap.

BRIEF DESCRIPTION OF THE DRAWINGS

FIG. 1 is a side view of a portion of a rotary kiln having a plurality of ports in accordance with the invention;

FIG. 5 is a view of a variation of the invention taken in a plane represented by the line II—II in FIG. 1;

FIG. 6 is a view of the discharge end of the port structure according to the modification of FIG. 5.

DESCRIPTION OF THE PREFERRED EMBODIMENT

Figure 3:
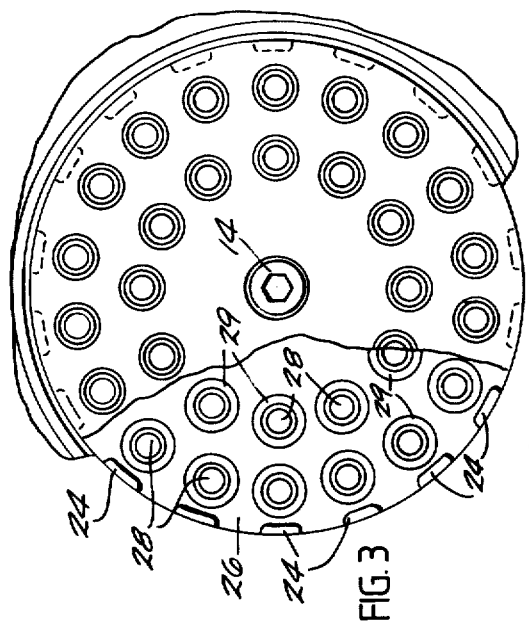
FIG. 3 is a view of the discharge end of the port structure.

A kiln 1 is shown in FIG. 1 as provided with an elongated cylindrical body portion 2 which defines a cylindrical chamber 3. The body portion 2 of the kiln 1 comprises an outer steel shell 4 which is lined with a suitable refractory liner 5, such as fire bricks. Any well known means may be provided for supporting and rotating the kiln 1. Since such means form no part of the present invention and are well known in the art, they are not shown herein.

Figure 2:
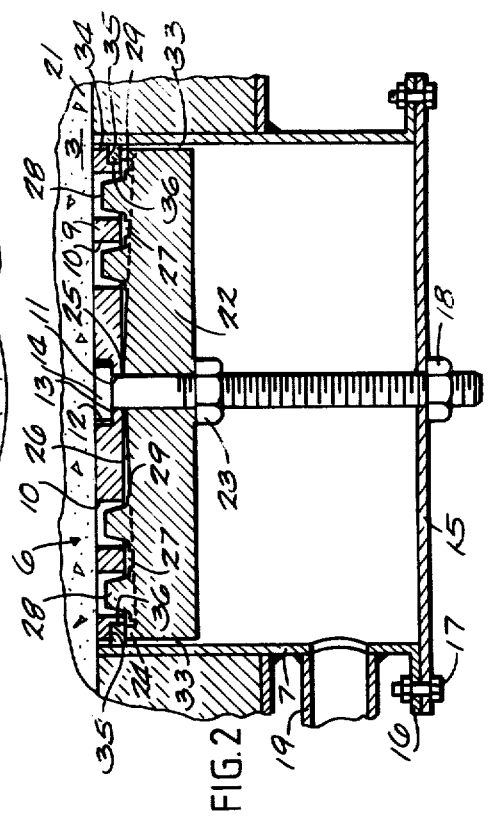
FIG. 2 is a section through a port in the kiln wall taken in a plane represented by the line II—II in FIG. 1.

A plurality of circumferentially and axially spaced port assemblies 6 are provided about the surface of the kiln opening into the chamber 3. The ports 6 are all similar in construction and operation, and a description of one of said ports will apply to all ports. As shown in FIG. 2, the port 6 comprises a cylindrical steel sleeve or port pipe 7 which is fixed within a suitable opening 8 formed in the wall of the kiln shell 2. Within the sleeve 7, a nozzle 9 is supported to effect a desired positioning of the nozzle interface with respect to the inner surface of the pipe 7.

As shown in FIGS. 2 and 3, the port 6 includes a nozzle 9 having a plurality of orifices 10 for directing fluid under pressure into the chamber 3 of the kiln shell 2. The nozzle 9 defines a centrally located bore 11 countersunk as at 12 to further define an annular surface 13 which receives a head portion of a bolt 14. At its opposite or outer end, the bolt 14 extends outwardly of the port sleeve 7 and a closure cap 15. Cap 15 is secured to a flange 16 on sleeve 7 by bolts 17 and a nut 18 is turned on end of bolt 14 projecting through cap 15.

As shown in FIGS. 1 and 2, fluid is supplied selectively to the ports 6 by supply pipes 19 connected into port assemblies 6 and to a source of fluid (not shown). As shown in FIG. 1, valve means 20 are shown associated with each port 6. It will be appreciated, while individual valve means 20 are shown associated with each port 6, a single valve 20 could be associated with a plurality of ports 6.

As the kiln 1 rotates, each valve 20 may be opened as its associated ports 6 rotate under a bed of material 21 within the kiln chamber 3, and each valve may be closed prior to such ports emerging from beneath the bed of material, in a manner such as disclosed in U.S. Pat. No. 4,070,149. Before the fluid under pressure is turned on to the ports under the material bed, small particles of the material in the bed can enter the orifices 10 of the nozzle 9 and enter the port sleeve 7. To minimize this condition, each port 6 assembly is provided with a base member 22, as shown in FIG. 2, which is clamped against the radially inner surface of the nozzle 9 by a nut 23 turned on a shank portion of bolt 14 between the member 22 and the cap 15.

The base member 22 is constructed to provide a surface 26 facing, but axially spaced from the nozzle 9 by a plurality of circumferentially spaced rest tabs 24 and a radial inner hub 25, with both rest tabs 24 and hub 25 projecting axially away from surface 26 and toward nozzle 9. A fluid distribution cavity 27 to thereby defined between the surface 26, nozzle 9, rest tabs 24 and hub 25. As shown in FIG. 2, surface 26 of base member 22 slopes from its circumference at rest tabs 24 toward hub 25 with fluid distribution cavity 27 having a constantly decreasing thickness from the circumference of cavity 27 to hub 25.

The base member 22, as shown in FIG. 2, is provided with a plurality of platforms 28 and annular shoulders 29 whereby each orifice 10 in nozzle 9 is associated with one platform 28 and one annular shoulder 29. It will be appreciated, while a fixed number of combinations of platforms, orifices and annular shoulders are shown in the drawings as incorporated with port assembly 6, a greater or lesser number of combinations of orifices, platforms and annular shoulders could be embodied within port assembly 6. It will further be appreciated that any one orifice 10 together with its associated platform 28 and annular shoulder 29 constitutes a separate and discrete port which is resistant to pugging and self-flushing (as shall hereinafter be described).

Figure 4:
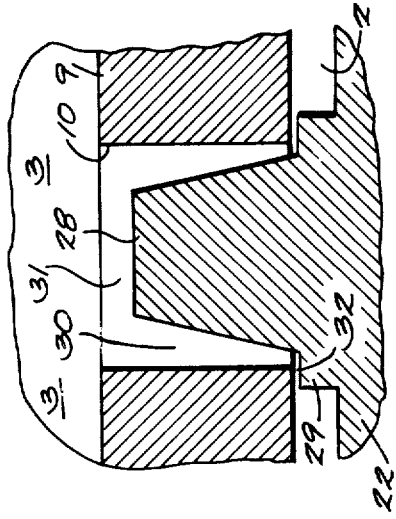
FIG. 4 is a view of a base member platform positioned in a nozzle orifice.

As all combinations of orifice 10, platform 28 and annular shoulder 29 are of similar construction and operation, a description of one shall apply to all such combinations. As shown in FIG. 4, platform 28 projects from base member 22 and extends axially through cavity 27 and into orifice 10 in nozzle 9. The platform 28 is of a diameter less than the diameter of the orifice 10 thereby partially plugging the orifice and cooperating with the nozzle to define an annular chamber 30. The platform 28 is also constructed to be of an axial length less than the axial dimension of the nozzle 9 and such that the platform terminates with a free end within orifice 10 to define a cylindrical chamber 31 within the orifice 10 in communication with the kiln chamber 3. Cylindrical chamber 31 preferably has an axial dimension equal to one-fifth (and not greater than one-half) the diameter of orifice 10.

The platform 28 is provided with particle barrier means comprising an annular shoulder 29 surrounding the platform 28 at the location of junction between the platform 28 and the base member 22. The shoulder 29 is constructed with a diameter greater than the diameter of the platform 28 and greater than the diameter of the orifice 10 in the nozzle 9. The annular shoulders 29 have an axial dimension less than the axial dimension of the cavity 27 thereby defining between each shoulder 29 and the nozzle 9 a particle barrier gap 32. The radial plane of gap 32 is perpendicular to the axis of annular chamber 30.

As shown in FIG. 2, base member 22 cooperates with sleeve 7 to define an annular fluid supply passage 33. An outer circumferential surface 34 of the nozzle 9 adjacent the base member 22 defines a radially and axially extending notch 35. A sealing ring 36 is provided within notch 35 and secured therein between nozzle 9 and rest tabs 24. Sealing ring 36 engages sleeve 7 in sealing contact preventing communication between annular fluid supply passage 33 and kiln chamber 3.

While annular fluid supply passage 33, as shown in FIG. 2 and described above, is a preferred embodiment, FIGS. 5 and 6 show an alternate embodiment. As shown in FIG. 5, a plurality of fluid supply orifices 37 are provided in base member 22, extending axially therethrough, for communication with cavity 27. The orifices 37 are positioned substantially equidistant away from platforms 28 as shown in FIG. 6.

Surface 26 of base member 22 is parallel to nozzle 9 and spaced therefrom by inner hub 25 and circumferential and continuous outer hub 38.

Figure 7:
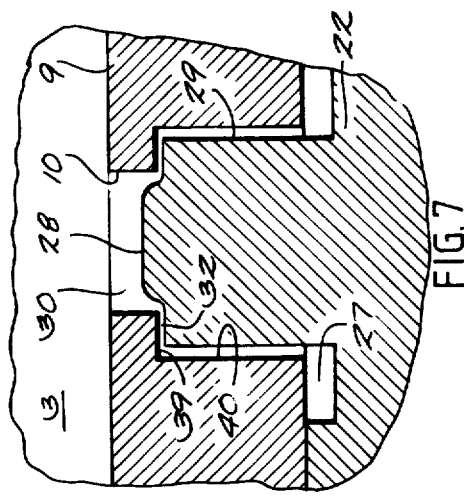
FIG. 7 is a view of a variation of the invention showing a base member platform positioned in a nozzle orifice.

While the positioning of platforms 28 within orifice 10, as shown in FIG. 4, is a preferred embodiment, FIG. 7 shows an alternative embodiment. As shown in FIG. 7, nozzle 9 is countersunk as at 39 to define a cylindrical orifice 40 coaxial with orifice 10. Platform 28 projects from base member 22 and extends axially through cavity 27 and orifice 40 and into orifice 10 in nozzle 9. Platform 28 is of a diameter less than the diameter of the orifice 10 thereby partially plugging the orifice and cooperating with nozzle 9 to define annular chamber 30. Annular shoulder 29, abutting platforms 28, projects away from base member 22 and is of axial dimension less than orifice 40 so as to cooperate with nozzle 9 to define particle barrier gap 32. Annular shoulder 29 is of diamater less than orifice 40 so as to permit communication between fluid distribution cavity 27 and particle barrier gap 32.

OPERATION

With the construction of ports 6 described, and particularly as shown in FIG. 2, the fluid which may be oxidizing gas and/or steam under pressure enters the port 6 through supply pipe 19 and flows through annular fluid supply passage 33. Sealing ring 36 causes the flow to divert with the fluid passing between rest tabs 24 into the fluid distribution cavity 27. The fluid then flows in the radial plane of cavity 27 with the constantly decreasing thickness of cavity 27 from its circumference to hub 25 ensuring an even distribution of the fluid flow to each of the particle trapping gaps 32 defined by the annular shoulders 29 and nozzle 9. The diverted fluid is caused to flow with considerable turbulence because of the several changes in directions of flow as the fluid passes through the annular fluid supply passage 33, cavity 27, through the particle barrier gaps 32, through the annular chamber 30 and finally into the kiln chamber 3.

While the fluid flows through ports 6 into the kiln 3 in the manner described, particles of the material within the kiln move through the kiln and over the ports 6 along a path which has both axial and transverse components. Particles of the charge material passing over the ports 6 within the kiln are subjected to a three-stage port screering, which excludes from the particle barrier gap 32 all but very small sized particles, which are most easily flushed out, and returned to the kiln by the described turbulent fluid flow through the ports 6. The first stage of the three-stage screening is achieved because particles larger than the diameter of the orifices 10 cannot pass from kiln chamber 3 into the cylindrical chamber 31. Additionally, chamber 31 prevents large particles from impacting with particles that do enter chamber 30 thereby caking the particles. Cylindrical chamber 31, having an axial dimension not greater than one-half the diameter of orifice 10, prevents particles of approximately the same diameter of the orifice from lodging in the chamber 31 by reason of bombardment by the tubmling bed of material. Chamber 30 is protected from plugging by the same mechanism by virtue of its entrance being inaccessible to the bombardment of large particles. Particles small enough to pass into the cylindrical chamber 31 are screened a second time by the much smaller opening into annular chamber 30. Particles small enough to pass into the annular chamber 30 are screened a third time by the still smaller opening of the particle barrier gap 32. Gap 32, having a radial plane perpendicular to annular chamber 30, prevents material from being packed within gap 32 by reason of forces transmitted from the tumbling bed through material which may accumulate in chamber 30 while gases are not flowing through the port. Thus, all but the very smallest size particles are mechanically screened from gap 32 while the particles too small to be mechanically excluded are hydraulically excluded by the flushing action of the turbulent fluid flow through gap 32.

During the life of the port 6, and particularly during periods of time when the port 6 is permitted to pass beneath the material charge when no fluids are passing through the port 6, certain amounts of small particulate matter will eventually enter the fluid distribution cavity 27, the annular fluid supply passage 33 and the interior of sleeve 7. While the port 6 rotates with kiln shell 2 to a position in overlying relation to material bed 21, particulate material within sleeve 7 will be urged by gravity into annular fluid supply passage 33 to rest against sealing ring 36. When the ports are in this overbed position, they may be purged by passing fluid through the port. The flow of fluid passing from the interior of sleeve 7 through the annular fluid supply passage 33 increases in velocity due to the change in volume through the fluid passages. This increase in velocity, together with the turbulent flow present as the flow is diverted by sealing ring 36 through rest tabs 24 into cavity 27, flushes particulate matter resting against sealing ring 36 into cavity 27 where it is further flushed through particle barrier gap 32 and into kiln chamber 3 as described above. In the operation of the embodiment as shown in FIGS. 5 and 6, fluid flows from the interior of sleeve 7 through fluid supply orifices 37 into fluid distribution cavity 27 for distribution to the orifice 10 in nozzle 9 as described above.

It will be appreciated while the port of the invention has been described as used with a rotary kiln, it can also be used in connection with reactors for treating a tumbling bed of mix sized particulate material such as dryers, coolers or the like.

From the foregoing detailed description of the present invention, it has been shown how the objects of the present invention have been attained in a preferred manner. However, modification and equivalents of the disclosed concepts, such as readily occur to those skilled in the art, are intended to be included in the scope of this invention. Thus, the scope of the invention is intended to be limited only by the scope of the claims such as or may hereafter be, appended hereto.

The embodiments of the invention in which an exclusive property or privilege is claimed are defined as follows:

1. A port assembly for supplying fluid through a shell of a reactor, such as a generally horizontal rotary kiln, for treating therein a tumbling bed of mix sized particulate material; said port assembly having a hollow sleeve adapted for attachment to the reactor shell and having a first end thereof in communication with a chamber within the reactor, the improvements comprising:
   (a) a cylindrical nozzle coaxially disposed within said sleeve adjacent said first end of said sleeve; an orifice formed in said nozzle having a central axis parallel to the sleeve;
   (b) means (19) for delivering a fluid to said sleeve remote from said first end of said sleeve and said nozzle;
   (c) a base member in said sleeve between said nozzle and said fluid delivery means with said base member cooperating with said nozzle to define a fluid distribution cavity therebetween and said base member cooperating with said sleeve to define a fluid passage from said fluid delivery means to said fluid distribution cavity;
   (d) a platform axially extending from said base member through the fluid distribution cavity and into the nozzle orifice in spaced relation to said nozzle; said platform cooperating with the nozzle to define an annular chamber in communication with the fluid distribution cavity and open on the side of said nozzle opposite said fluid distribution; and (e) an annular shoulder abutting said platform and said base member with said annular shoulder projecting away from the platform and away from the base member into the fluid distribution cavity in spaced relation to said nozzle and nozzle orifice to thereby cooperate with the nozzle to define a particle barrier gap between the nozzle and the shoulder on a side of the nozzle facing the base member; whereby ingress of particulate material from the reactor chamber into the port assembly is screened by a multistage screening in which particles too large to pass into the annular chamber are excluded therefrom and particles small enough to pass into the annular chamber are screened from entering the fluid distribution cavity by the particle barrier gap.

2. A port assembly according to claim 1, wherein said platform is of an axial dimension less than the axial dimension of the nozzle thereby defining a cylindrical chamber opening in communication with the reactor chamber whereby said cylindrical chamber separates said annular chamber from said tumbling bed of particulate material preventing material within the tumbling bed from pounding and wedging material within the annular chamber.

3. A port assembly according to claim 2, wherein said cylindrical chamber has an axial dimension not greater than half the diameter of said orifice within the nozzle.

4. A port assembly according to claim 1 wherein said annular shoulder is spaced from said nozzle a distance less than the radial dimension of the annular chamber defined by the platform spaced from said nozzle.

* * * * *